United States Patent [19]
Fernstrom

[11] 3,759,403
[45] Sept. 18, 1973

[54] STORAGE SYSTEM
[75] Inventor: Henry C. Fernstrom, Northbrook, Ill.
[73] Assignee: Barrett Electronics Corporation, Northbrook, Ill.
[22] Filed: Aug. 23, 1971
[21] Appl. No.: 173,851

[52] U.S. Cl........... 214/16.4 A, 104/244.1, 104/247
[51] Int. Cl............................................... B65g 1/06
[58] Field of Search ................ 214/16.4 A, 16.4 B; 104/244.1, 247

[56] References Cited
UNITED STATES PATENTS

| 548,090 | 10/1895 | Puffer | 214/16.4 A |
|---|---|---|---|
| 1,793,288 | 2/1931 | Martin | 104/247 |
| 2,951,599 | 9/1960 | Bogar | 214/16.1 R |
| 3,353,501 | 11/1967 | Kidera et al. | 214/16.4 A |
| 3,371,804 | 3/1968 | Chasar | 214/16.4 A |

FOREIGN PATENTS OR APPLICATIONS

| 257,298 | 9/1964 | Australia | 214/16.4 A |
|---|---|---|---|
| 743,825 | 4/1933 | France | 104/247 |
| 1,443,101 | 5/1966 | France | 214/16.4 A |

Primary Examiner—Gerald M. Forlenza
Assistant Examiner—R. B. Johnson
Attorney—John A. Dienner et al.

[57] ABSTRACT

A storage system for pallets for access by straddle type fork lift trucks and stock selector trucks from the same aisles, wherein guide rails are disposed adjacent each aisle for cooperation with guide means on the stock selector trucks to guide the stock selector trucks through the aisles when selecting cartoned items from the pallets, the guide rails being positioned to allow passage thereunder of forwardly extending base legs on the straddle type fork lift trucks when loading pallets into the storage racks.

3 Claims, 9 Drawing Figures

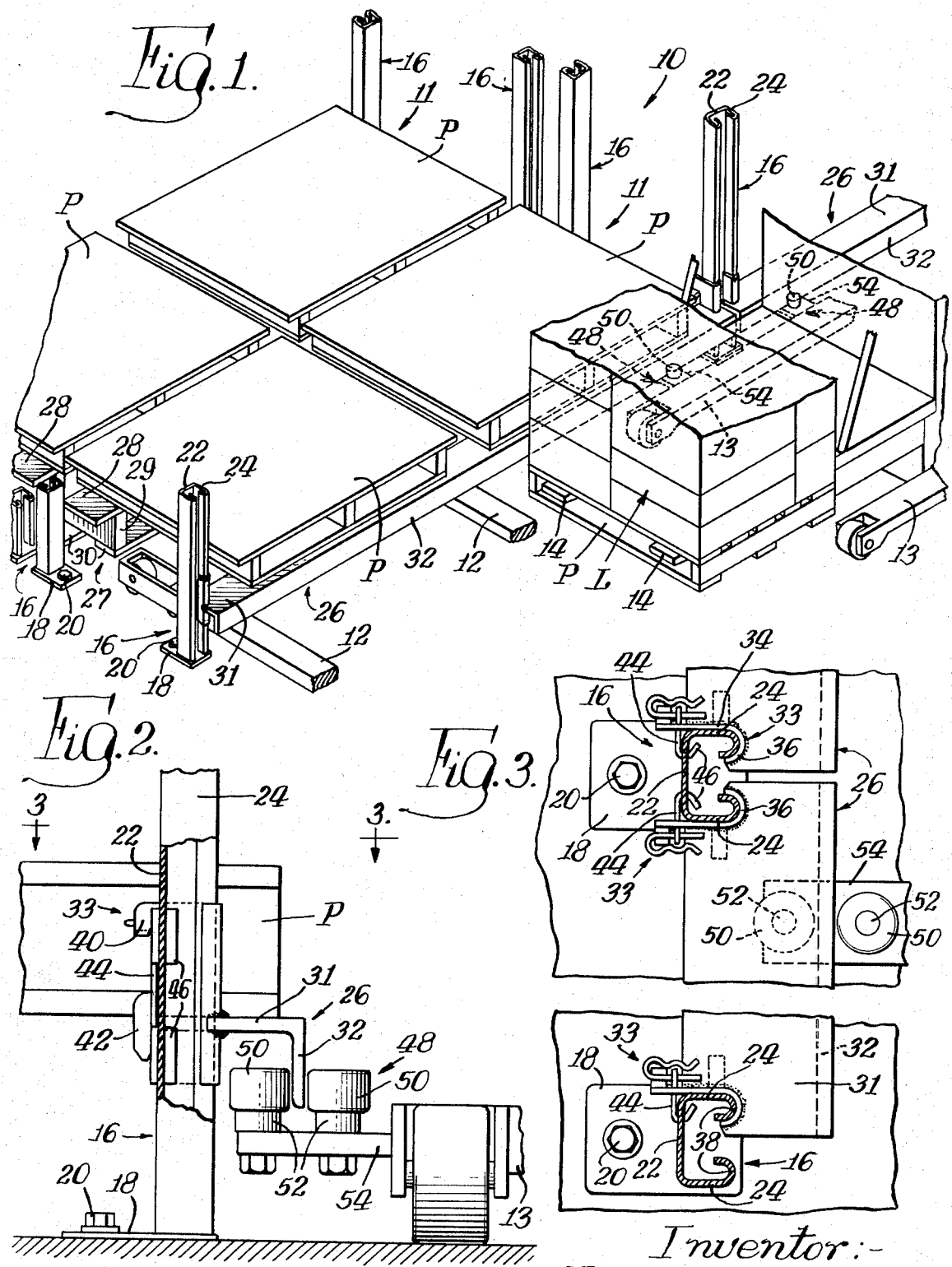

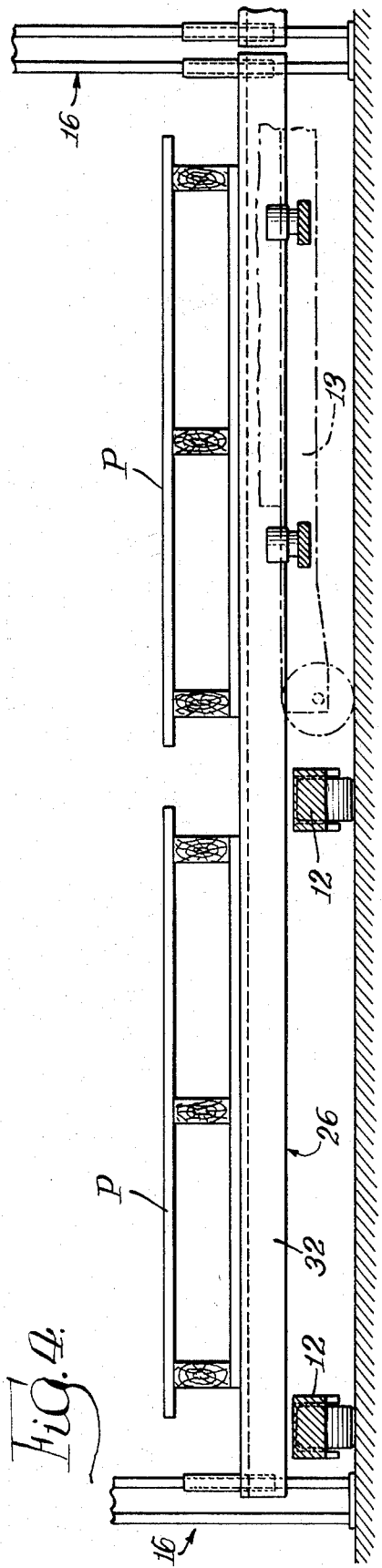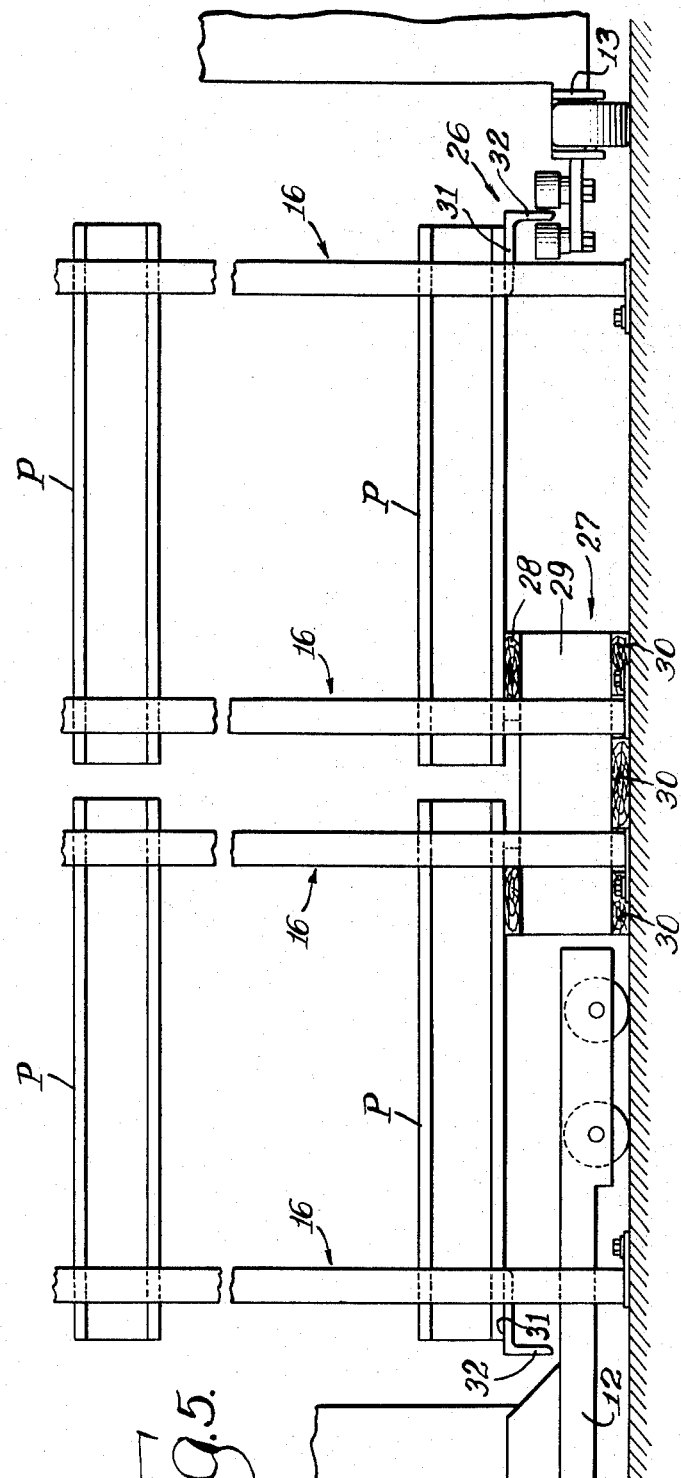

PATENTED SEP 18 1973  3,759,403

STORAGE SYSTEM

BACKGROUND OF THE INVENTION

The present invention relates to storage systems, and more particularly to a pallet storage system which provides guided movement of stock selector trucks through the aisles while allowing maneuverability of straddle type fork lift trucks to replenish stock in the same aisles.

It is a common practice to store cartons on pallets which are then placed on rack rails by straddle type fork lift trucks maneuverable through aisles defined between the storage racks. The lift trucks conventionally employ lift forks which are vertically movable to place the pallets upon horizontal pallet supporting rails spaced at varying vertical heights above the floor surface. It is customary to thereafter selectively retrieve small quantities of materials from various of the stacked pallets for filling orders. It has been found particularly efficient to provide storage systems wherein freely maneuverable hi-lift fork trucks are used to place loaded pallets of similar materials upon the storage racks, with discrete quantities of items being thereafter selectively retrieved from the different pallets by means of stock selector trucks to fill individual orders. It has been found highly desirable to couple the stock selector trucks in guiding relation to the storage racks during movement through the aisles so that an operator may select individual items from the pallets without having to control the direction of his truck.

The known storage systems provide spaced rows of pallet support racks which have guide means between alternate rows of racks to guide stock selector trucks, such as Model RCSS manufactured by Barrett Electronics Corporation of North-brook, Illinois. The guide means of the known systems comprise, in one embodiment, a floor mounted upwardly projecting guide rail which is received between downwardly projecting double spaced rollers mounted on the stock selector truck. While this guide system has been adequate, it required floor mounted lead-in rails to guide the spaced rollers into cooperation with the upwardly projecting guide rail. In another known guidance system, angle guides are secured to the floor surface adjacent the opposed storage racks, and guide rollers are mounted on opposite sides of the stock selector trucks for rolling engagement with the spaced angle guides. The latter guidance system also requires floor mounted lead-in guide rails for directing the stock selector truck between the parallel portions of the guide rails along an aisle, and both of the known systems require that the guide rails be strongly secured to the floor through high strength lag bolts or other suitable means which substantially increase the cost of such systems. The known storage systems of the aforedescribed type further require that aisles be provided in alternating relation to the guide rail aisles to allow maneuverability of straddle fork lift trucks for loading pallets into the storage racks. The straddle fork lift trucks have forwardly extending base legs or outriggers, such as on Model RST manufactured by Barrett Electronics Corporation. These base legs must pass under the lowermost horizontal pallet support members or guide rails to allow placement of pallets in the storage racks. With guide rail systems of the known type, the straddle fork lift trucks had to be maneuvered in back-up aisles separate from the guide rail aisles, thus requiring substantially more aisle area than would be required if both the stock selector trucks and the straddle fork lift trucks could operate in the same aisles.

The present invention provides an improved storage system which accommodates maneuverability of both straddle fork lift trucks and guided stock selector trucks in the same aisles when placing loaded pallets in the storage racks and when retrieving selected items therefrom, thus substantially reducing the aisle area required by the prior art storage and retrieval systems.

SUMMARY OF THE INVENTION

One of the primary objects of the present invention is to provide a storage system which allows access to the storage racks by straddle fork lift trucks to stock loaded pallets into the storage racks, while also providing guidance means for cooperation with stock selector trucks to guide the stock selector trucks along the same aisles as they are maneuvered to select goods from the pallets.

Another object of the present invention is to provide a storage system wherein the stock selector truck guide means allow the truck operator to safely and readily maneuver the truck into guided relation with guide rails supported in each aisle without damaging side forces being applied to the guide rails and guide rollers.

In carrying out the objects of the present invention, a storage rack system is provided having a plurality of rows of storage racks which include vertical support columns secured to a floor surface. Vertically spaced horizontal pallet supporting rails are secured to the vertical support columns to receive and support loaded pallets for storage preparatory to selection of goods from the loaded pallets. The storage rack rows are paired such that each row has its rear portion in back-to-back relation with the rear portion of another row, and has its front edge spaced from and parallel to an opposing row to define an aisle therebetween for the passage of straddle fork lift trucks and stock selector trucks. In a preferred embodiment, the lowermost pallet supporting rail adjacent each aisle is spaced vertically above the floor surface to allow passage thereunder of the forwardly projecting base legs or outriggers of straddle fork lift trucks which are maneuverable in the aisles to place loaded pallets into the pallet supporting rail members. These lowermost pallet supporting members have downwardly depending guide rails thereon which are received between upwardly facing spaced guide rollers secured to base legs of stock selector trucks to maintain the stock selector trucks in guided directions as they are maneuvered through the same aisles during selection of various items from the pallets for filling orders. The storage rack system in accordance with the present invention provides maximum storage capacity and minimum aisle area by allowing maneuverability of both unguided straddle fork lift trucks and guided stock selector trucks in the same aisles while placing loaded pallets on the storage racks and thereafter selecting items from the various pallets.

Further objects and advantages of the present invention together with the organization and manner of operation thereof will become apparent from the following detailed description of a preferred embodiment of the invention when taken in conjunction with the accompanying drawings wherein like reference numerals designate like parts throughout the and parallel views.

BRIEF DESCRIPTION OF THE DRAWINGS

FIG. 1 is a perspective view of a portion of a storage rack system in accordance with the present invention, illustrating the guide rail of the lowermost pallet support member in guiding relation with a stock selector truck, while allowing passage thereunder of the outriggers of a straddle fork lift truck;

FIG. 2 is a partial end view of the storage racks of FIG. 1, and shows the guide rollers of a stock selector truck in guiding relation with the guide rail of the lowermost pallet support member, a portion of the support column being broken away to better illustrate the guide rail attaching bracket;

FIG. 3 is a foreshortened partial horizontal sectional view taken generally along the lines 3—3 of FIG. 2, looking in the direction of the arrows and with the pallets removed;

FIG. 4 is a partial front elevational view of the storage rack arrangement shown in FIG. 1 with the base leg of a stock selector truck in guiding relation with the lower guide rail, and with the forward outriggers of a straddle fork lift truck projecting under the guide rail;

FIG. 5 is a partial end elevational view of the storage racks shown in FIG. 4;

DESCRIPTION OF PREFERRED EMBODIMENTS

Figure 6:
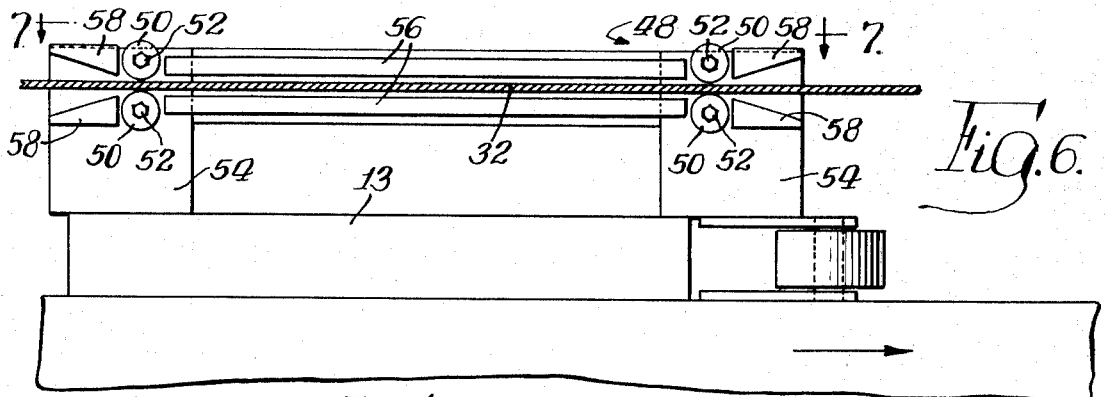
FIG. 6 is a partial plan view of a guide bar arrangement for use with the guide rollers on the stock selector truck.

Referring now to the drawings, and in particular to FIG. 1, a portion of a storage system in accordance with the present invention is indicated generally at 10. The illustrated portion of the storage system is representative of a relatively large storage area comprised of rows of storage racks, each row being indicated generally at 11. As will become more apparent hereinbelow, the rows of storage racks are positioned in pairs of two parallel back-to-back rows. The back-to-back rows of storage racks 11 define with pairs of parallel rows of racks spaced on either side therefrom aisles for passage therealong of straddle fork lift trucks and stock selector trucks. The straddle fork lift trucks which are maneuverable within the aisles are of known design, such as the above referenced model RST manufactured by Barret Electronics Corporation of Northbrook, Illinois. Such known straddle fork lift trucks have forwardly projecting outriggers or base legs, indicated partially at 12, which provide counter-balance means for pallet loads vertically lifted and transported on a lift fork assembly (not shown) above the outriggers 12. Straddle fork lift trucks of the referenced type are conventionally used to transport pallets P with variable lengths and widths carrying cubed quantities of goods which are to be stored in the storage racks. The straddle fork lift trucks are manually maneuvered through the storage area and must be steered in a direction facing the row of racks with the outriggers 12 allowed to pass under the pallet support rails in order to place loaded pallets upon the storage racks as is known.

The stock selector trucks, which are maneuverable within the same aisles as the straddle fork lift trucks, may be of known construction, such as the above-referenced Model RCSS manufactured by the Barrett Electronics Corporation, and include pairs of forwardly projecting base legs, as shown partially at 13. The stock selector trucks have vertically movable forks 14 which extend forwardly of an operator support platform (not shown) vertically movable with the forks 14 so that an operator can stand on the operator support platform and select individual cartons from the storage racks and place them upon a pallet P or other type of container carried by the forks. As will be more fully described hereinbelow, the stock selector trucks have means thereon for establishing guiding relation with guide means on the storage racks adjacent each of the aisles through which the stock selector trucks travel. By providing such guiding relation of the stock selector trucks, an operator can direct his efforts to order selection without having to steer his stock selector truck.

In accordance with the present invention, the straddle fork lift trucks and the stock selector trucks having guide means for coupling the stock selector trucks to the storage racks are maneuverable through the same aisles for placing loaded pallets onto the storage racks and for selecting individual items from the stored pallets. By providing for maneuverability of both the straddle fork lift trucks and stock selector trucks within the same aisles, the rows of pallet supporting racks can be positioned in pairs such that the rearward edges of the pallets are in back-to-back relation to pallets in the next adjacent row of stored pallets thereby eliminating the need for aisles extending along both sides of a row to allow access by the straddle fork lift trucks from one aisle and access to the same row by the stock selector trucks from a second aisle as required in prior known storage systems.

The storage system 10 in accordance with one embodiment of the present invention includes vertical suport columns, each of which is indicated generally at 16, which are secured in upstanding relation to a floor surface through foot plates 18 and anchor bolts 20. Noting FIG. 3, the vertical support columns 16 have generally C-shaped transverse cross-sectional configurations which are defined by web portions 22 having parallel spaced flange portions 24 formed integral with the web portion and lying in planes parallel to the plane of the web portion. The vertical support columns 16 are secured to the floor surface through the foot plates 18 such that the support columns are arranged in pairs, considered along a row of storage racks, with their web portions being in opposed back-to-back relation.

The aligned pairs of vertical support columns 16 have horizontal pallet supporting rail members secured thereto in vertically spaced relation upwardly from the floor surface. The horizontal pallet supporting members serve to receive and support loaded pallets P thereon in a known manner. The lowermost horizontal pallet supporting rail members, indicated generally at 26 in FIG. 1, adjacent each aisle within the storage system 10 are spaced vertically above the floor surface sufficiently to allow passage thereunder of the forwardly projecting base legs or outriggers 12 of the freely maneuverable straddle fork lift trucks for placing pallets on the horizontal pallet support members as aforenoted.

The rearward support columns 16 of each row of storage racks are spaced from the opposing rearward columns of the next adjacent row. A pallet support frame structure, indicated generally at 27, is mounted on the floor surface generally between the opposed rearward spaced support columns 16 of each pair of rows of storage racks, and serves to support the rearward edge portions of the lowermost pallets P at a level even with the forward lowermost horizontal pallet support rail members 26. With reference to FIG. 1, taken in conjunction with FIG. 5, the pallet support frame structure 27 may be made of wood or other suitable material and includes a pair of parallel spaced upper support members 28 which extend between the corresponding rear support columns 16 and receive the rear edge portions of the pallets placed in the corresponding storage rack row. The support members 28 are spaced vertically above the floor by transverse blocks 29, there preferably being a plurality of blocks 29 spaced longitudinally along the support members 28. The transverse support blocks 29 are secured at their lower edges to three parallel spaced floor engaging planks 30, the center plank having a length sufficient to extend between the rearward opposed support columns 16 of the back-to-back rows of storage racks.

The lowermost horizontal pallet supporting rail members 26 adjacent each of the aisles through which the straddle fork lift trucks and stock selector trucks travel within the storage system 10 preferably comprise inverted L-shaped angles which include generally planar horizontal plate portions 31 which serve with the upper support members 28 of the frame structure 27 to support the lowermost pallets P when placed thereon. The lowermost supporting rail members 26 further have downwardly depending elongated guide rail portions 32 which lie in vertical planes and are formed integral with the horizontal plate portions 31. The lowermost horizontal pallet support rail members 26 are secured to the vertical support columns 16 adjacent the corresponding aisles such that the guide rails 32 extend slightly outwardly into the aisles. To this end, each of the pallet support members 26 has mounting bracket means, indicated generally at 33, secured to opposite ends thereof for releasably connecting the guide rails to the associated vertical support columns 16.

Each of the mounting bracket means 33 includes a planer plate portion 34 having a vertically disposed generally semi-circular curved portion 36 adapted to receive a similarly curved vertically disposed forward edge portion 38 formed on the outermost vertical edge of each of the parallel flanges 24 of the vertical support columns 16. In this manner, each mounting bracket 33 may be mated with one of the side flanges 24 of a vertical support column 16 with the plate portion 34 of each mounting bracket abutting the outer surface of the corresponding flange portion 24. The mounting bracket means 33 are secured to the associated pallet support members 26 by suitable means, such as welding, so that the end portions of the guide rails 32 extend substantially to the vertical centers of the support columns 16, as shown in FIG. 3, when in assembled relation. The guide rails 32 thus form a substantially continuous guide rail along the full length of each aisle.

With reference to FIGS. 2 and 3, each of the mounting bracket means 33 includes vertically spaced inverted hook-like portions 40 and 42 formed integral with the plate portion 34. The hook-like portions 40 and 42 of each of the mounting brackets 33 are adapted to cooperate with a keeper member 44 which has spaced leg portions 46 received through suitable slots formed in the web portion 22 of the associated support columns 16. Each of the support columns 16 has a plurality of elongated openings spaced vertically along the web portion 22 thereof to receive and support keeper members 44 for selectively mounting horizontal pallet support rail members in vertically spaced relation on the support columns 16. It will be understood that the horizontal pallet support rail members spaced vertically above the lowermost forward pallet support members 26 need not be provided with downwardly depending guide rails 32, the primary function of the depending guide rails 32 being described hereinbelow. It will further be understood that other suitable means than the described mounting brackets 33 and associated keeper members 44 may be employed to releasably secure the horizontal pallet support rail members on the support columns 16.

The elongated guide rails 32 on the lowermost pallet support rail members 26 adjacent the aisles through which the straddle fork lift trucks and stock selector trucks travel are cooperative with guide means secured to the stock selector trucks for guiding the stock selector trucks through the corresponding aisles without requiring an operator to steer his stock selector truck. To this end, each of the stock selector trucks is provided with guide means, indicated generally at 48, on at least one of its base legs 13 for engagement with the guide rails 32 within an aisle for guiding the truck through the aisle as the operator selects goods from various of the loaded pallets. The guide means 48 comprise pairs of rollers 50 supported for rotational movement about the vertical axes of mounting shafts 52 affixed on horizontal support plates 54 which in turn are secured in transverse relation to one of the forwardly projecting base legs 13 of the stock selector truck such that the guide rollers 50 extend laterally outwardly of the side of the stock selector truck. The rollers 50 are supported on the support plates 54 such that the axes of rotation of each pair of spaced rollers lie in a vertical plane transverse to the longitudinal axis of the corresponding base leg 13, the rollers 50 of each pair being spaced apart sufficiently to slidingly receive a downwardly depending guide rail 32 therebetween. In this manner, it can be seen that as a stock selector truck having the guide rollers 50 thereon is moved into an aisle for retrieving goods from selected of the stored pallets P, the guide rollers 50 may be caused to cooperatively receive the guide rail 32 therebetween such that the associated stock selector truck is guided in a pre-determined directional path through the aisle.

Two pairs of guide rollers 50 are secured to a base leg 13 of the stock selector truck and spaced longitudinally along the base leg such that the base leg, and thus the associated stock selector truck, cannot angularly deviate from the associated guide rails 32 during movement through the aisles. The necessity of the operator steering the stock selector truck through an aisle when retrieving goods from various of the loaded pallets stored on the storage racks is thus eliminated. Correspondingly, with the guide rails 32 spaced vertically above the floor surface, the forwardly projecting outriggers 12 of a straddle fork lift truck may be maneuvered beneath the lowermost pallet support members 26 for placing a loaded pallet P onto the corresponding storage racks above the floor surface, this being accomplished within the same aisle that provides guidance for the stock selector truck having the base legs 13 and guide means 48 thereon.

Figure 7:
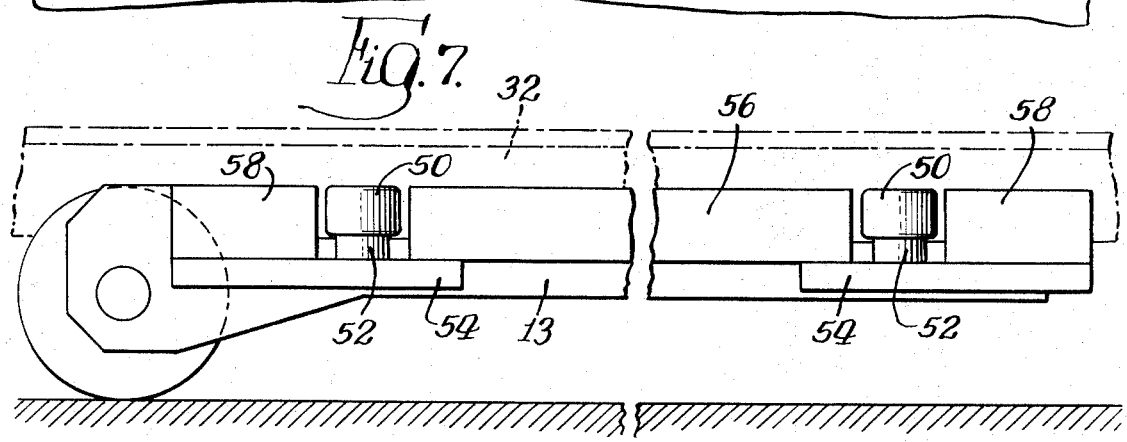
FIG. 7 is a foreshortened partial side elevational view of the guide bar and guide roller arrangement shown in FIG. 6 taken substantially along the line 7—7 of FIG. 6.

With reference to FIGS. 6 and 7, an embodiment of the guide means 48 on a stock selector truck is illustrated which has guide bars 56 and lead-in guides 58 associated with the spaced guide rollers 50 to insure proper engagement of the guide rollers with a guide rail 32 of the storage racks when the stock selector truck initially enters an aisle between storage racks. The guide bars 56 are preferably rectangular in cross-section and are supported in parallel spaced relation with their inner opposing surfaces spaced apart slightly greater than the spacing the guide rollers 50 so as not to normally engage a guide rail 32 during travel of the stock selector truck through an aisle. As shown, the lead-in guides 58 have converging inner opposed surfaces, when considered toward the associated guide rollers 50, to provide a generally converging lead-in slot for the end of a guide rail 32 as the stock selector initially enters an aisle. With the lead-in guides 58 and guide bars 56 associated with the guide rollers 50 on a stock selector truck, as shown in FIGS. 6 and 7, the operator may readily drive the stock selector truck to a position wherein the forward pair of guide rollers 50 and the associated forward lead-in guides 58 are positioned to receive the outer end of a guide rail 32. If the stock selector truck is not exactly aligned to receive the guide rail 32 between the rollers 50, the end of the guide rail will engage the inner surface of one of the lead-in guides 58 and assist in directing the stock selector truck to a position wherein the guide rail will be received between the forward guide rollers 50. After the guide rail 32 has been received through the forward pair of guide rollers 50 and the stock selector truck is moved further forwardly, the guide blocks 56 will engage the end of the guide rail and prevent the stock selector truck from deviating in a direction that would cause the forward end of the guide rail to impact against one of the rear guide rollers 50. Thus, the guide bars 56 serve to substantially eliminate the possible incidence of damaging impact loads against the guide bearings 50 on the guide means 48 of the stock selector truck.

Figure 8:
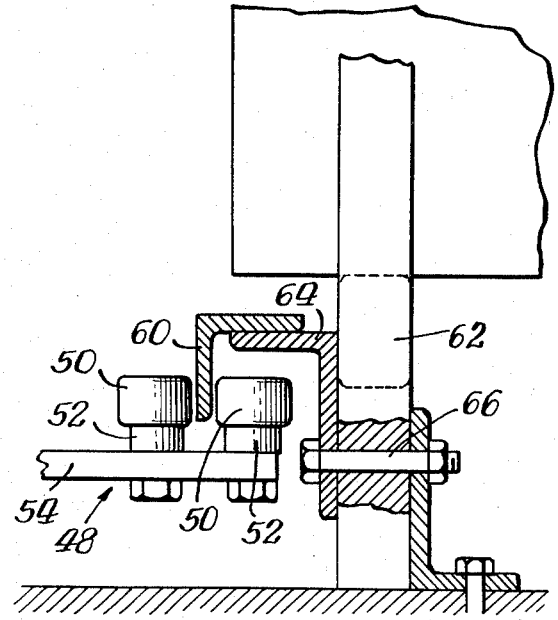
FIG. 8 is a partial vertical sectional view illustrating an alternative manner of mounting the stock selector truck guide rails on storage rack support columns.

FIG. 8 illustrates an alternative embodiment of mounting a guide rail for cooperation with the guide rollers 50 on a stock selector truck. As therein shown, a guide member 60 is secured to vertical support columns 62 of a storage rack through a second angle support 64 which is secured to the vertical support columns 62 by bolt means 66. The guide member 60 is suitably secured to the support angle 64, as by welding, and is spaced vertically above the floor surface to allow passage thereunder of the forwardly projecting outriggers 12 of a straddle lift fork truck in similar fashion to the above described guide rail 32. The manner of mounting the guide member 60 lends itself to installation in an existing storage system wherein it is desired to provide guidance means for stock selector trucks having guide means 48 thereon.

Figure 9:
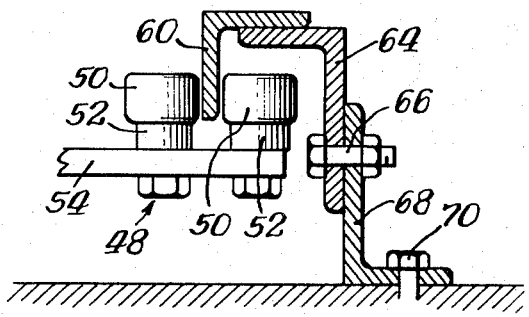
FIG. 9 is a vertical sectional view illustrating an arrangement for mounting the stock selector truck guide rails independently of the storage rack support columns.

FIG. 9 illustrates still another manner of mounting a guide member 60 for guiding cooperation with the spaced guide rollers 50 on a stock selector truck, and finds particular application where an existing storage system does not readily lend itself to securing the guide member to vertical support columns. The elongated guide member 60 of FIG. 9 is similarly secured to a support angle 64 which, in turn, is secured through bolts 66 to a plurality of upwardly directed support angles 68 spaced along the length of the guide 60 and lagged to the floor surface through lag bolts 70. The guide member 60 in FIG. 9 is also supported above the floor surface to allow passage thereunder of the forwardly extending outriggers 12 of a straddle lift fork truck. It will be understood that the floor mounting angles 68 shown in FIG. 9 are spaced along the longitudinal lengths of the guide angles 60 sufficiently to allow ready maneuverability of the straddle lift fork truck outriggers when placing pallets P onto the storage racks.

The storage system 10 in accordance with the present invention thus readily accommodates movement of straddle lift fork trucks for placing pallets upon the storage racks without interfering with the forwardly projecting outriggers 12 on the straddle lift fork trucks, while also providing means for guiding stock selector trucks through the same aisles for selecting quantities of goods from various of the pallets in making up orders for shipment from the stored goods. It will be understood that guide rails 28 or 60 may be provided on both sides of each aisle through which the stock selector trucks are maneuvered so that guide means 48 may be provided on only one side of a stock selector truck for engagement with the guide rails on either side of an aisle depending upon the desired direction of movement of the stock selector truck.

While preferred embodiments of the present invention have been illustrated and described, it will be obvious to those skilled in the art that changes and modifications may be made therein without departing from the invention in its broader aspects.

I claim:

1. A storage system for supporting pallets and the like, comprising, in combination, storage rack means having generally upstanding support columns and horizontal pallet supporting members secured to said support columns, said storage rack means defining aisles therebetween of sufficient width for accommodating stock selector trucks, the lowermost horizontal pallet supporting member of all of said storage rack means adjacent the aisles being spaced vertically above the floor surface and each having an elongated guide rail disposed generally parallel to the floor surface and spaced thereabove a distance large enough to accommodate the passage thereunder of the forwardly projecting outriggers of conventional straddle lift fork trucks, and a stock selector truck having guide means for guiding said truck along said guide rail, said guide means including at least one pair of guide rollers supported for rotation about the vertical axis, said guide rollers spaced apart such that they are in rolling engagement with opposite sides of said guide rail.

2. A storage system as defined in claim 1 wherein said guide means further includes leadin guide members adjacent each pair of guide rollers to effect entry of a guide rail between the associated guide rollers.

3. A storage system as defined in claim 2 wherein said guide means further includes a pair of parallel spaced guide bars extending between the spaced pairs of guide rollers, said guide bars being spaced apart a distance greater than the spacing of said rollers comprising each pair of guide rollers.

* * * * *